United States Patent [19]
Agrawal et al.

[11] Patent Number: 5,819,266
[45] Date of Patent: *Oct. 6, 1998

[54] SYSTEM AND METHOD FOR MINING SEQUENTIAL PATTERNS IN A LARGE DATABASE

[75] Inventors: Rakesh Agrawal; Ramakrishnan Srikant, both of San Jose, Calif.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 398,640

[22] Filed: Mar. 3, 1995

[51] Int. Cl.$^6$ .................................................. G06F 17/30
[52] U.S. Cl. .............................................................. 707/6
[58] Field of Search ........................... 395/600, 6; 707/6

[56] References Cited

U.S. PATENT DOCUMENTS

| | | | |
|---|---|---|---|
| 5,151,988 | 9/1992 | Yamagashi | 395/600 |
| 5,490,060 | 2/1996 | Malec et al. | 364/401 |
| 5,553,279 | 9/1996 | Goldring | 395/600 |
| 5,615,341 | 3/1997 | Agrawal et al. | 395/210 |

OTHER PUBLICATIONS

R. Agrawal et al., "Mining Association Rule Between Sets of Items in Large Databases", Proc. 1993 ACM Sigmod Conf., pp. 207–216, 1993.
R. Agrawal et al., "Fast Algorithms for Mining Association Rules", Proceedings of the 1994 VLDB Conference, pp. 487–499, 1994.
M. Houtsma et al., "Set–Oriented Mining for Association Rules in Relational Databases", Proc. 11th Conference on Data Engineering, pp. 25–33, 1995.
H. Mannila et al., "Improved Methods for Finding Association Rules", Pub. No. C–1993–65, 20 pages, Univ. Helsinki, 1993.
J.J. Bernardo et al., Sequencing Rules for Productivity Improvements, Pub. Decis, Sci., V. 22, #3, pp. 620–634, Jul.–Aug., 1991.
M.D. Merrill, et al., Instructional Transaction Shells: Responsibilities, Methods, and Parameters, Pub. Educ. Technol. V. 32, #2, pp. 5–25, Feb. 1992.
W.D. Hopkins, et al., "Sequential Pattern Recognition Machine", IBM TDB, vol. 16, No. 1, pp. 97–99, Jun. 1973.
O. Klaassen, "Modeling Data Base Reference Behavior", Computer Performance Evaluation, G. Balbo, et al, eds, pp. 47–60, 1992.
Wang et al, Combinational Pattern Discovery for Scientfic Data: Some Preliminary Results, Proc Acm Sigmod Conf. on Management of Data, Minneapolis, May, 1994.
Agrawal et al: "Mining Sequential Patterns", Proceedings of the 11th International Conference on Data Engineering, Mar. 6, 1995, Taipei, pp. 3–14, XP000670556.
Faloutsos et al: "Fast Subsequence Matching in Time–Series Databases" 1994 ACM Sigmod International Conference on Management of Data, vol. 23, No. 2, May 1994, Minneapolis, MN, pp. 419–429, XP002048519.
Agrawal et al: "Database Mining: A Performance Perspective", IEEE Transactions on Knowledge and Data Engineering, vol. 5, No. 6, Dec. 1993, USA, pp. 914–925, XP002048520.
European Search Report, Sep. 01, 1998, Berlin 28 Nov. 1997, Examiner J. Nicholls.

*Primary Examiner*—Wayne Amsbury
*Attorney, Agent, or Firm*—Baker Maxham Jester & Meador

[57] ABSTRACT

A system and method for mining databases includes a computer-implemented program which identifies patterns of transaction sequences that are stored in a database and which recur in the database with a user-defined regularity. The invention first identifies which sequences are large, i.e., which recur with the defined regularity, and then determines which sequences are maximal, i.e., which large sequences are not subsets of other large sequences. The set of maximal large sequences is returned to the user to indicate recurring purchasing patterns over time.

33 Claims, 5 Drawing Sheets

SYSTEM AND METHOD FOR MINING SEQUENTIAL PATTERNS IN A LARGE DATABASE

CROSS REFERENCE TO RELATED APPLICATIONS

This application contains material related to the following copending U.S. patent applications, which are commonly assigned with this application: U.S. patent application Ser. No. 08/227,428, filed Apr. 14, 1994 for "SYSTEM AND METHOD FOR QUERY OPTIMIZATION USING QUANTILE VALUES OF A LARGE UNORDERED DATA SET, now pending."; U.S. patent application Ser. No. 08/415,006, filed Mar. 31, 1995, for "SYSTEM AND METHOD FOR QUICKLY MINING ASSOCIATION RULES IN DATABASES,", now pending; U.S. patent application Ser. No. 08/436,794 filed May 8, 1995, for "SYSTEM AND METHOD FOR MINING GENERALIZED ASSOCIATION RULES IN DATABASES" now U.S. Pat. No. 5,615,341;U.S. patent application Ser. No. 08/437,746, filed May 9, 1995, for "SYSTEM AND METHOD FOR DISCOVERING SIMILAR TIME SEQUENCES IN DATABASES", now pending; U.S. patent application Ser. No. 08/459,018, filed Jun. 2, 1995, for "SYSTEM AND METHOD FOR DEFINING SHAPES WITH WHICH TO MINE TIME SEQUENCES IN COMPUTERIZED DATABASES", now pending; and U.S. patent application Ser. No. 08/500,717, filed Jul. 11, 1995, for "SYSTEM AND METHOD FOR PARALLEL MINING OF ASSOCIATION RULES IN DATABASES", now pending.

BACKGROUND OF THE INVENTION

1. Field of the Invention

The present invention relates generally to data processing, and more particularly to "computer database mining" in which significant sequential patterns of transactions are discovered. In particular, the invention concerns mining a large database of sales transactions.

2. Description of the Related Art

Customer purchasing patterns over time can provide invaluable marketing information for a wide variety of applications. For example, advertisers can create better advertising campaigns by exploiting known consumer purchasing patterns. As a further example, retailers, with a thorough knowledge of customer purchasing patterns over time, can create more effective store displays and more effectively control inventory than would otherwise be possible without such knowledge. Still further, catalogue companies can conduct more effective mass mailings if they know that, given that a consumer has purchased a first item, the same consumer can be expected, with some degree of probability, to purchase a particular second item within a defined time period after the first purchase.

It will be appreciated that purchasing patterns can be classified many ways. For example, it may be desirable to know what non-empty set of items (termed herein an "itemset"), a consumer is likely to buy together during a single transaction. Of importance to the present invention is customer transaction patterns over time. Stated differently, the focus of the present invention is to identify patterns in temporally-spaced customer transactions, i.e., to identify which transactions a consumer is relatively likely to undertake some time period after the consumer has undertaken other particular transactions. The present invention recognizes that by knowing such patterns, retailers and catalogue companies can, for example, create advertising and mailings which are relatively highly appealing because such advertising would be developed with the customers' previous transactions in mind. It is to be understood that although this discussion focusses on the marketing applications of the present invention, database mining and, hence, the principles of the present invention, are useful in many other areas, e.g., business and science.

It happens that until recently, compiling large, detailed databases that could chronicle thousands, and from a statistical view preferably millions, of customer transactions, much less deriving useful information from the databases (i.e., mining the databases), was highly impractical. Consequently, marketing and advertising strategies have been based upon anecdotal evidence of purchasing patterns, if any at all, and thus have been susceptible to inefficiencies in consumer targeting that have been difficult if not impossible to overcome.

With the advent of modern technology, however, compiling large databases of customer transactions has become possible. The ubiquitous bar-code reader can almost instantaneously read so-called basket data, i.e., when a particular item from a particular lot was purchased by a customer, how many items the customer purchased, and so on, for automatic electronic storage of the basket data. Further, when the purchase is made with, e.g., a credit card, the identity of the purchaser can be almost instantaneously known, recorded, and stored along with the basket data. Still further, vastly improved data storage media have made it possible to electronically store vast amounts of such information for future use.

As alluded to above, however, compiling a transaction database is only part of the marketing challenge. Another important part is the mining of the database for useful information. Such database mining becomes increasingly problematic as the size of databases expands into the gigabyte and indeed the terabyte range.

Further complicating the particular problem addressed by the present invention is that in attempting to identify customer purchasing patterns (i.e., sequences), as the skilled artisan will appreciate, consecutive characters of the sequences are not separated by noise characters of fixed length, but rather by noise characters of variable length. Consequently, past efforts to identify sequences in which the characters are separated by noise characters of fixed length, designed as they are to solve problems different than the one addressed herein, are ineffective to solve the particular problem faced by the present inventors. Moreover, the sequences sought to be identified by the present invention can consist of sets of characters, vice simply characters, even further complicating the problem and rendering past efforts ineffective in solving it.

Accordingly, it is an object of the present invention to provide a system and method for quickly mining large databases. Another object of the present invention is to provide a system and method for ascertaining data patterns in a transaction database. Still another object of the present invention is to provide a system and method for rapidly finding sequences of temporally-spaced transactions in a database which repeat with a user-defined degree of regularity, and which guarantees that all sequences of interest are identified. Yet another object of the present invention is to provide a system and method for quickly mining large databases which is easy to use and cost-effective.

SUMMARY OF THE INVENTION

A program storage device is disclosed which is readable by a digital processing apparatus ("processor") and which tangibly embodies a program of instructions that is executable by the digital processing apparatus to perform method steps for identifying patterns in customer transaction sequences. The executed method steps include storing the sequences in a database, with each sequence comprising a plurality of temporally-spaced transactions, each being characterized by one or more itemsets. Also, the method includes identifying large sequences in the database, and then outputting the large sequences for identifying particular transaction sequences over time.

In a preferred embodiment, execution of the identifying step includes the step of entering an itemset into a set of large itemsets when the number of times the itemset is present in the database exceeds a predefined minimum support value. Also, the method includes discarding a transaction when the transaction does not include an itemset in the set of large itemsets, and discarding a sequence when the sequence does not include an itemset in the set of large itemsets, to generate a transformed set of customer sequences. At the same time, each of the remaining transactions is replaced by the set of large itemsets contained in the transaction. Then, a forward set of large sequences is defined, and sequences in the forward set of large sequences are concatenated in accordance with a predetermined concatenation regime to generate a next set of candidate large sequences.

Each sequence in the next set of candidate large sequences is compared to the sequences in the transformed set of customer sequences to determine the number of times the candidate large sequence is present in the transformed set of customer sequences, and a candidate large sequence is entered into a next forward set of large sequences when the number of times the candidate large sequence is present in the transformed set of customer sequences is greater than the minimum support value. Next, a large sequence is entered into a set of maximal large sequences when the sequence is not contained in another large sequence.

In one embodiment, the method iteratively repeats selected steps, including defining the forward set of large sequences in an iteration to be the next forward set of large sequences of the immediately preceding iteration. Further, the method iteratively repeats selected steps such that for each iteration the predetermined concatenation regime causes the device to concatenate the sequences in the immediately preceding forward set of large sequences to generate the next set of candidate large sequences. Each candidate large sequence has one more itemsets than the large sequences used to generate it, and candidate large sequences are successively entered into the subsequent next forward set of large sequences.

In another embodiment, selected next sets of candidate large sequences are generated by concatenating the candidate large sequences of a preceding step to generate sets of skipped candidate large sequences. After at least one iteration is complete, skipped candidate large sequences are compared to selected sequences generated in previous iterations. After comparison, the skipped candidate large sequences are discarded when they are contained in sequences generated in previous iterations to generate a set of remaining skipped sequences. Then, each remaining skipped sequence is compared to the sequences in the transformed set of customer sequences to determine the number of times the remaining skipped sequence is present in the transformed set of customer sequences. A remaining skipped sequence is entered into the set of maximal large sequences when the number of times the remaining skipped sequence is present in the transformed set of customer sequences is greater than the minimum support value.

In yet another embodiment, the method executed according to this invention iteratively repeats selected steps such that for each iteration the predetermined concatenation regime causes the device to concatenate at least some of the large sequences to generate a set of candidate large sequences, such that each candidate large sequence contains n itemsets more than at least some of the large sequences used to generate it, wherein n is an integer greater than one (1). In this embodiment, the spacing between iterations is n, and sets of candidate large sequences are generated between iterations only after at least one iteration has been completed by concatenating selected sequences to generate sets of skipped candidate large sequences.

The method of the alternate embodiment of this invention further includes generating skipped candidate large sequences and comparing them to sequences generated in previous iterations, after at least one iteration is complete, and then discarding skipped candidate large sequences when they are contained in sequences generated in previous iterations to generate a set of remaining skipped sequences. Moreover, each remaining skipped sequence is compared to the sequences in the transformed set of customer sequences to determine the number of times the remaining skipped sequence is present in the transformed set of customer sequences. Then, a remaining skipped sequence is entered into the set of maximal large sequences when the number of times the remaining skipped sequence is present in the transformed set of customer sequences is greater than the minimum support value.

Another aspect of the present invention is the method disclosed above which is executed by a processor that executes a series of computer executable instructions stored on a program storage device.

In another aspect of the present invention, a database mining system for mining patterns in transaction sequences which are stored in a database is disclosed, wherein each sequence includes a plurality of temporally unique transactions characterized by one or more itemsets. The system of the present invention includes means for entering an itemset into a set of large itemsets when the number of times the itemset is present in the database exceeds a predefined minimum support value. Also, the system includes means accessing the entering means for discarding a transaction when the transaction does not include an itemset in the set of large itemsets and discarding a sequence when the sequence does not include an itemset in the set of large itemsets, to generate a transformed set of customer sequences. Still further, means are provided for defining a forward set of large sequences and concatenating sequences in the forward set of large sequences in accordance with a predetermined concatenation regime to generate a next set of candidate large sequences.

Additionally, the system includes means accessing the discarding means and defining means for comparing each sequence in the next set of candidate large sequences to the sequences in the transformed set of customer sequences to determine the number of times the candidate large sequence is present in the transformed set of customer sequences. Means are also provided for accessing the comparing means for entering a candidate large sequence into a next forward set of large sequences when the number of times the candidate large sequence is present in the transformed set of customer sequences is greater than the minimum support value. Preferably, the system includes means for entering a large sequence into a set of maximal large sequences when the sequence is not contained in another large sequence. The system still further includes means for outputting the set of maximal large sequences for identifying patterns in transaction sequences.

In still another aspect of the present invention, a database mining system for mining transaction sequences includes a database that stores the sequences, each stored sequence including a plurality of transactions having itemsets and associated time fields. The mining system also includes a support value input mechanism for defining a minimum support value, as well as a large sequence determiner in operable communication with the database and the support value input mechanism for comparing the number of times a sequence is repeated in the database and for designating the sequence as a large sequence when the number of times is greater than the minimum support value. Moreover, in one preferred embodiment the database mining system of the present invention includes a maximal large sequence generator accessing the large sequence determiner for designating as a maximal large sequence any large sequence which is not contained in another large sequence to thereby mine the database for maximal large sequences.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
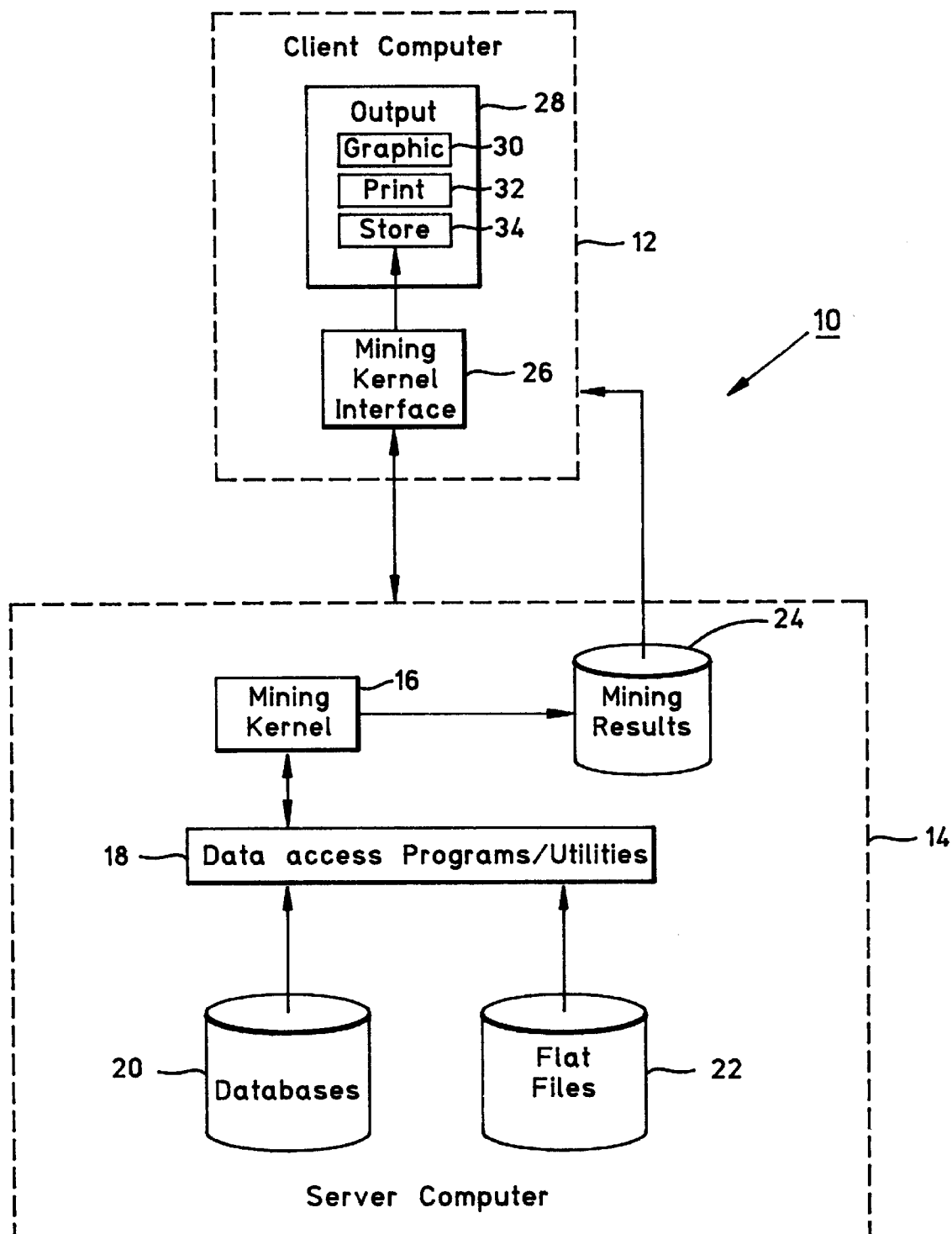
FIG. 1 is a functional block diagram of the system for mining sequential patterns of the present invention.

Referring initially to FIG. 1, a system for mining databases for transaction sequences is shown, generally designated 10. In the particular architecture shown, the system 10 includes one or more digital processing apparatus, such as a client computer 12 and a server computer 14. In one intended embodiment, the server computer 14 may be a mainframe computer made by IBM Corp. of Armonk, N.Y., and use an operating system sold under trademarks such as MVS. Or, the server computer 14 may be a Unix computer, or OS/2 server, or Windows NT server. The server computer 14 may own a database system, such as DB2 or ORACLE, or it may have data on files on some data storage medium such as disk or tape.

As shown, the server computer 14 includes a mining kernel 16 which may be executed by a processor within the server computer 14 as a series of computer-executable instructions. These instructions may reside, for example, in RAM of the computer 14. It is to be understood that architectures other than the one shown may be used. For example, the functions of the client computer 12 may be incorporated into the server computer 14, and vice versa.

Alternatively, the instructions may be contained on a data storage medium, such as a computer diskette. Or, the instructions may be stored on a DASD array, magnetic tape, conventional hard disk drive, electronic read-only memory, optical storage device, paper punch cards, or other appropriate data storage device. In an illustrative embodiment of the invention, the computer-executable instructions may be lines of compiled $C^{++}$ language code. FIGS. 2–9 illustrate, in the form of a flowchart, the structure of such a computer program.

FIG. 1 shows that, through appropriate data access programs and utilities 18, the mining kernel 16 accesses one or more databases 20 and/or flat files (i.e., text files) 22 which contain data chronicling transactions. After executing the steps described below, the mining kernel outputs the desired transaction data to a mining results repository 24, which can be accessed by the client computer 12.

Additionally, FIG. 1 shows that the client computer 12 can include a mining kernel interface 26 which, like the mining kernel 16, may be implemented in suitable computer code. Among other things, the interface 26 functions as an input mechanism for establishing certain variables, including the minimum support value defined below. Further, the client computer 12 preferably includes an output module 28 for outputting/displaying the mining results on a graphic display 30, print mechanism 32, or data storage medium 34.

Figure 2:
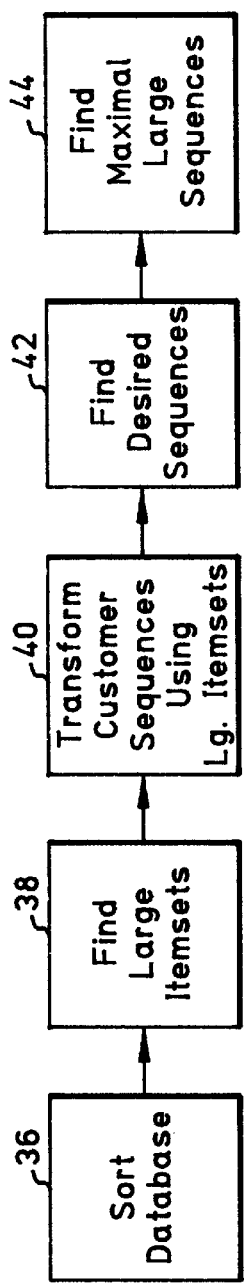
FIG. 2 is a flow chart showing the overall operation of the present invention.

FIG. 2 shows the overall method of the present invention. Beginning with block 36, the system 10 sorts the data in the database 20, preferably into a hash tree configuration. In understanding how the system 10 sorts the database 20, and indeed in understanding the problem on which the present invention in focussed, reference to Tables 1–3 is helpful.

TABLE 1

| Original Database | | |
|---|---|---|
| Transaction Time | Customer ID. | Items Purchased |
| June 10 | 2 | 10, 20 |
| June 12 | 5 | 90 |
| June 15 | 2 | 30 |
| June 20 | 2 | 40, 60, 70 |
| June 25 | 4 | 30 |
| June 25 | 3 | 30, 50, 70 |
| June 25 | 1 | 30 |
| June 30 | 1 | 90 |
| June 30 | 4 | 40, 70 |
| July 25 | 4 | 90 |
| July 26 | 3 | 50 |

TABLE 2

| Database sorted by Customer ID | | |
|---|---|---|
| Customer ID. | Transaction Time | Items Purchased |
| 1 | June 25 | 30 |
| 1 | June 30 | 90 |
| 2 | June 10 | 10, 20 |
| 2 | June 15 | 30 |
| 2 | June 20 | 40, 60, 70 |
| 3 | June 25 | 30, 50, 70 |
| 3 | July 26 | 50 |

TABLE 2-continued

Database sorted by Customer ID

| Customer ID. | Transaction Time | Items Purchased |
|---|---|---|
| 4 | June 25 | 30 |
| 4 | June 30 | 40, 70 |
| 4 | July 25 | 90 |
| 5 | June 12 | 90 |

TABLE 3

Customer Sequence Version of Database

| Customer ID. | Customer Sequence |
|---|---|
| 1 | <(30) (90)> |
| 2 | <(10 20) (30) (40 60 70)> |
| 3 | <(30 50 70) (50)> |
| 4 | <(30) (40 70) (90)> |
| 5 | <(90)> |

TABLE 4

Customer Sequences Transformed to Large Itemsets

Sequential Patterns with Support > 25%

| <(30) (40 70)> | <(30) (40 90)> |
|---|---|

As shown in Table 1, the database 20 typically is initially arranged by transaction time, and it contains data on both customer identity and itemsets that were purchased as part of the transaction. As intended by the present invention, an itemset includes one or more items. Accordingly, for the first transaction shown in Table 1, the transaction is characterized by the itemset <(10, 20)>, wherein items 10 and 20 are individual items. Stated differently, a transaction may contain one or items, i.e., a transaction may (and usually will) be composed of itemsets. Further, for a given customer the period between transactions may vary.

The problem addressed by the present invention is mining the database 20 to identify sequences of time-spaced transactions which are large, and which preferably are also maximal sequences. By large sequences is meant the sequences which appear in the database with a user-defined regularity, termed herein as "minimum support". For example, the user may want to know what transaction sequences appear for at least 25% of the customers in the database. The minimum support value in this instance is 25%, and by counting the number of customers who support a sequence and then dividing by the total number of customers, it may be determined whether the sequence meets the minimum support criterion. Likewise, by counting the number of customers who support an itemset and then dividing by the total number of customers, it may be determined whether the itemset meets the minimum support criterion.

On the other hand, a large sequence may or may not be maximal. For some applications, it may desirable to know all large sequences. For other applications, it may be desirable to know only the large sequences that are also maximal. A sequence is maximal if it is not contained in any other (longer) sequence. A sequence of items $(a_1, a_2 \ldots a_n)$ is contained in another sequence $(b_1, b_2 \ldots b_m)$ if there exists integers $i_1<i_2<i_n<$, such that $a_1 \subseteq b_{i1}, \ldots a_n \subseteq b_{in}$. Accordingly, the sequence <(3) (4 5) (8)> is contained in the sequence <(7) (3 8) (9) (4 5 6) (8)>, but the sequence <(3) (5)> is not contained in <(3 5)>, and vice-versa.

At block 36, the data is sorted by customer identity, and for a given customer by transaction time, as shown in Table 2. Then, the data is rearranged as shown in Table 3, such that for each customer, the transactions are arranged in temporal sequence. For instance, in Table 3, for customer #2, three transactions are included in the customer sequence. The first transaction for customer #2 includes items #10 and #20, the second transaction includes item #30, and the third transaction includes items #40, 60, and 70. If desired, the transactions in the database 20 can be further screened for certain time criteria. For example, it may not be desirable to count two transactions as being in a single sequence if some minimal time period is not present between them, or if some maximal time period has been exceeded between transactions.

Next, at block 38, the system 10 identifies the large itemsets in the sorted database. As intended by the present invention, an itemset is supported only once by a given customer. Thus, for customer #3 in Table 3, although item #50 appears twice it is counted only once in determining whether it meets the minimum support criterion.

The general method of determining whether an itemset is large is discussed above. It should be noted that in counting itemset/transaction sequences, customer #4 supports the sequence <(30) (90)> because the sequences of interest do not necessarily include contiguous items. Further, the sequence <(30) (40 70)> is supported by both customers #2 and #4, in that customer #2, in a single transaction, buys item #60 along with items #40 and #70, and <(40 70)> is a subset of <(40 60 70)>. The following publications, all of which are incorporated herein by reference, disclose specific methods for finding large itemsets: Agrawal et al., "Mining Association Rules Between Sets of Items in Large Databases", *Proc. of the ACM Sigmod Conference on Management of Data*, Washington, D.C. 1993; Agrawal et al., "Fast Algorithms for Mining Association Rules in Large Databases", *Proc. of the VLDB Conference*, Santiago, Chile 1994; Houtsma et al., "Set-Oriented Mining of Association Rules", *IBM Research Report RJ9567*, October, 1993; and Mannila et al., "Efficient Algorithms for Discovering Association Rules", *KDD-94:AAAI Workshop on Knowledge Discovery in Databases*, July 1994. The methods set forth in the above-referenced publications should be modified to count a customer only once for support of an itemset, even if the customer buys the same itemset in two different transactions.

Then, at block 40, the customer sequences are transformed to sequences of large itemsets, as shown in Table 4. More particularly, in the example shown in Tables 1–4, only sequences <(30 90)> and <(30) (40 70)> are large, i.e., appear for at least 25% of the customer fields. Table 4 shows an example of a transformed database of the present invention, designated $D_T$. As the skilled artisan will recognize, $D_T$ is essentially a transformed set of customer sequences.

At block 42, the desired large sequences are found by one of the concatenation regimes described below, and at block 44, the set of maximal large sequences are found. Without loss of generality of the present invention, as further disclosed below the operations undertaken in blocks 42 and 44 may be combined in some concatenation regimes.

Accordingly, as intended by the present invention block 42 establishes a large sequence determiner which compares the number of times a sequence is repeated in the database and which designates the sequence as a large sequence when the number of times is greater than the minimum support value. Furthermore, block 44 establishes a maximal large sequence generator which designates as a maximal large sequence any large sequence which is not contained in another large sequence.

Figure 3:
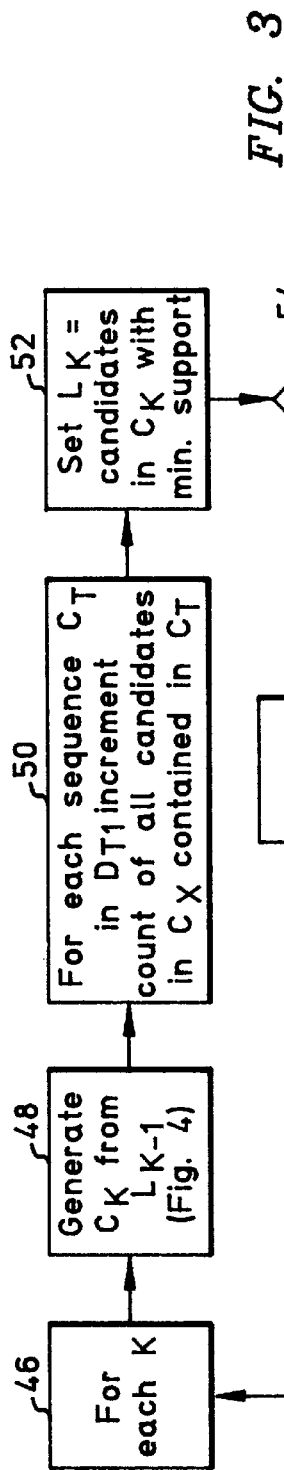
FIG. 3 is a flow chart showing the operation of the AprioriAll embodiment of the present invention.
Figure 4:
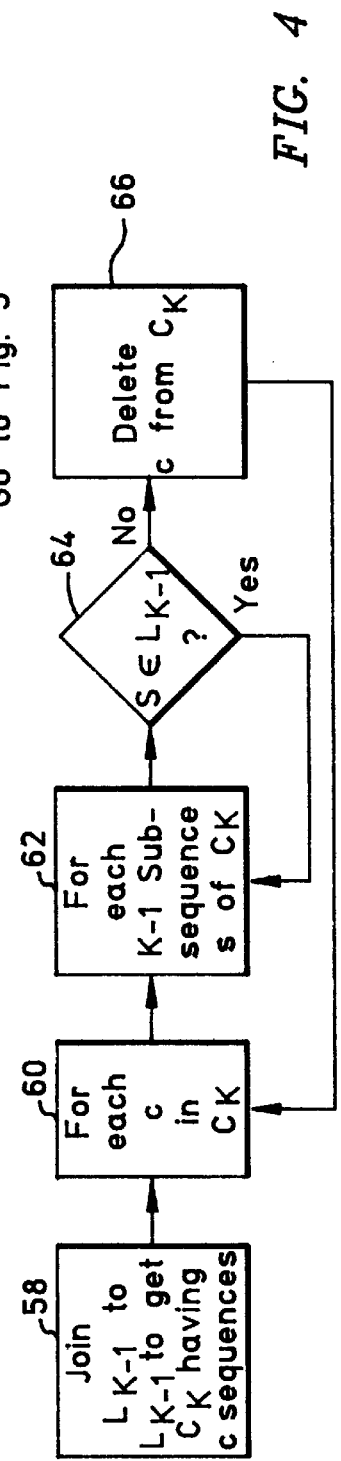
FIG. 4 is a flow chart showing the candidate generation of the AprioriAll embodiment of the present invention.
Figure 5:
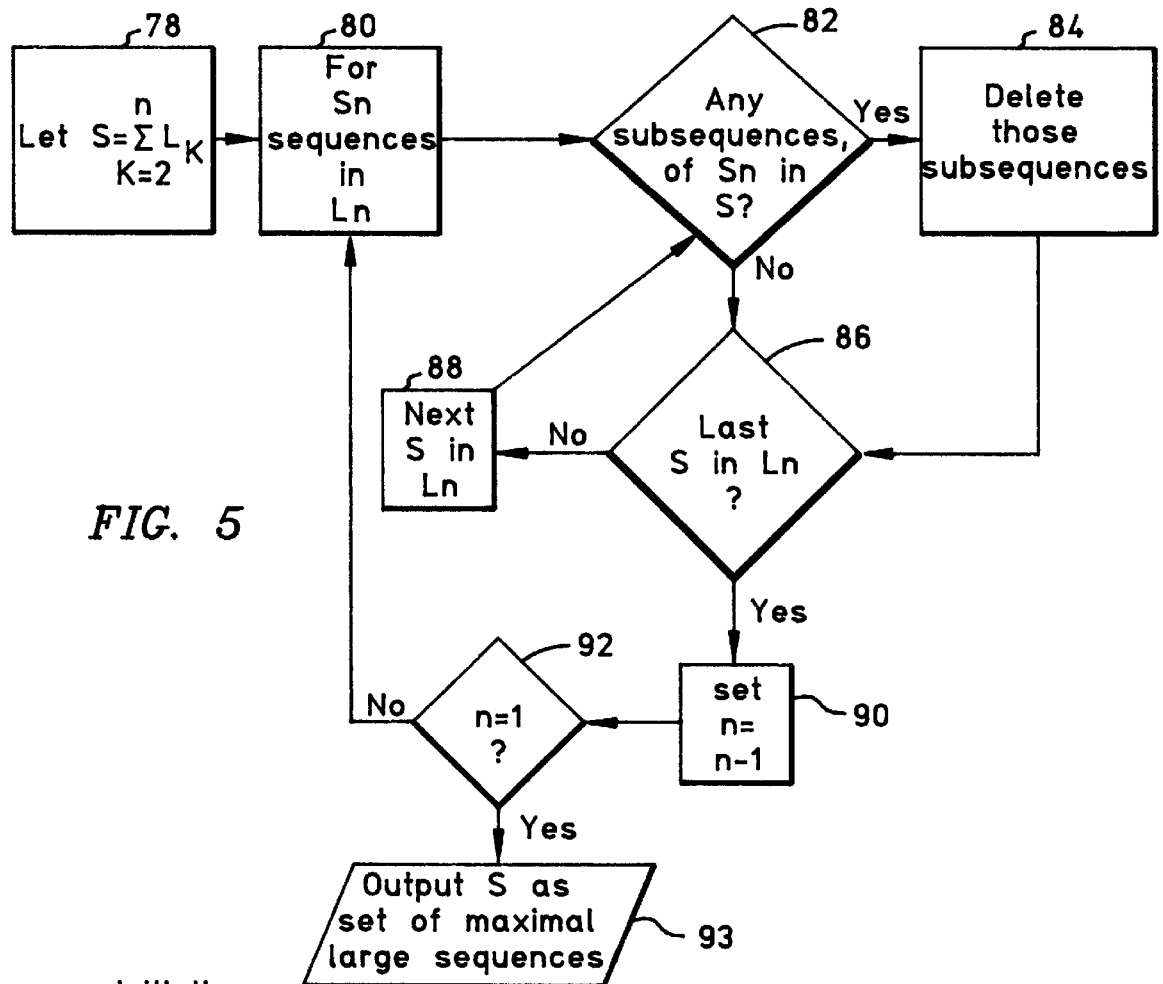
FIG. 5 is a flow chart showing the maximal phase of the AprioriAll embodiment of the present invention.

Now referring to FIGS. 3–5, the first of three embodiments, termed herein "AprioriAll", of the concatenation regime of the present invention used at block 42 and 44 of FIG. 2 is shown. As disclosed below in reference to FIG. 4, the method starts at block 46 for each k. In general, in the AprioriAll method, a seed set of large sequences $L_{k-1}$, having a length (i.e., number of itemsets) equal to "k−1" (initially consisting of the set of large itemsets disclosed above, wherein k=2) is used for generating a set of candidate large sequences $C_k$ having length k+1 at block 48. Then, the method determines the support for the candidate large sequences by examining the transformed customer sequences $c_T$ in $D_T$ to increment the count of each candidate sequence in $C_k$ that is contained in some $C_T$ and then dividing by the total number of customers. At block 52, the resulting forward set $L_k$ of actual large sequences become the seed for the next iteration. After determining all of the large sequences (by ascertaining, at decision block 54, whether $L_k$ is null), the maximal sequences among the large sequences can be determined as disclosed in reference to FIG. 5 below. If $L_k$ is not null at block 54, the method proceeds to block 56 to set k=k+1, and thence to block 46.

FIG. 4 shows the details of creating sets of candidate large sequences. At block 58, $L_{k-1}$ is concatenated (i.e., joined) to itself to create an initial $C_k$ having c sequences. More particularly, the itemsets, designated as p.1itemset$_1$, p.1itemset$_2$ . . . p.1itemset$_{k-1}$ of $L_{k-1}$, are joined to each of the other itemsets, designated q.1itemset$_1$, q.1itemset$_2$. . . q.1itemset$_{k-1}$ in $L_{k-1}$ to yield a set $C_k$ of candidate large sequences c, each c having k itemsets, with the constraint that no sequence c in $C_k$ is repeated.

Thus, using Table 5 below as an example:

TABLE 5

| Sequence | Support | After Join |     |
| --- | --- | --- | --- |
| <1 2 3> | 2 | <1 2 3 4> |     |
| <1 2 4> | 2 | <1 2 4 3> |     |
| <1 3 4> | 3 | <1 3 4 5> |     |
| <1 3 5> | 2 | <1 3 5 4> |     |
| <2 3 4> | 2 | <1 2 3 3> |     |
|     |     | <1 2 4 4> |     |
|     |     | <1 3 4 4> |     |
|     |     | <1 3 5 5> |     |
|     |     | <2 3 4 4> |     |

Next, the system 10 prunes candidate sequences c from $C_k$ which contain any subsequences not found in $L_{k-1}$. The system 10 considers, at block 60, each customer sequence c in the set of candidate large sequences $C_k$ as described below, and then proceeds to block 62 for each subsequence s having k−1 itemsets of the candidate set of large sequences $C_k$.

Starting with the initial candidate sequence c in the set of candidate large sequences $C_k$, and with the initial subsequence s of $C_k$ having k−1 ietmsets at decision block 64, the system 10 determines whether s is an element of the immediately preceding set of actual large sequences $L_{k-1}$. As intended by the present invention, the set of large itemsets is used as the seed for the first iteration.

If s is an element of the immediately preceding set of actual large sequences $L_{k-1}$, the system 10 moves back to block 62 to retrieve the next subsequence s in $C_k$. Otherwise, the system 10 proceeds to block 66 to delete, i.e., prune, c from $C_k$, and then the system 10 returns to block 60 to test the next sequence c in $C_k$. In the example shown in Table 5, only the sequence <1 2 3 4> is left after pruning.

FIG. 5 shows the method by which the AprioriAll method can, if desired, determine which of the large sequences found above are maximal large sequences. Starting at block 78, a set S is defined to be the sum of all the sets $L_k$ of large sequences, k=n to 1, wherein n is the largest sequence length found above. Then, at block 80, the system 10 selects an $s_n$ sequences in $L_n$ and determines, at decision block 82, whether any subsequences of $s_n$ are in S. If so, the system 10 proceeds to block 84 to delete those subsequences, and thence to decision block 86 to determine whether the sequence s under test is the last sequence in $L_n$. Otherwise, the system 10 proceeds directly to decision block 86.

If, at decision block 86, the sequence under test is not the last sequence in $L_n$, the system proceeds to block 88 to select the next sequence in $L_n$, and then returns to decision block 82. On the other hand, if the test at decision block 86 is positive, the system 90 proceeds to block 90 to set n=n−1, and then tests at decision block 92 whether n=1. If not, the system 10 returns to block 80. Otherwise, the system 10 proceeds to output block 93 and outputs S as the set of maximal large sequences.

Figure 6:
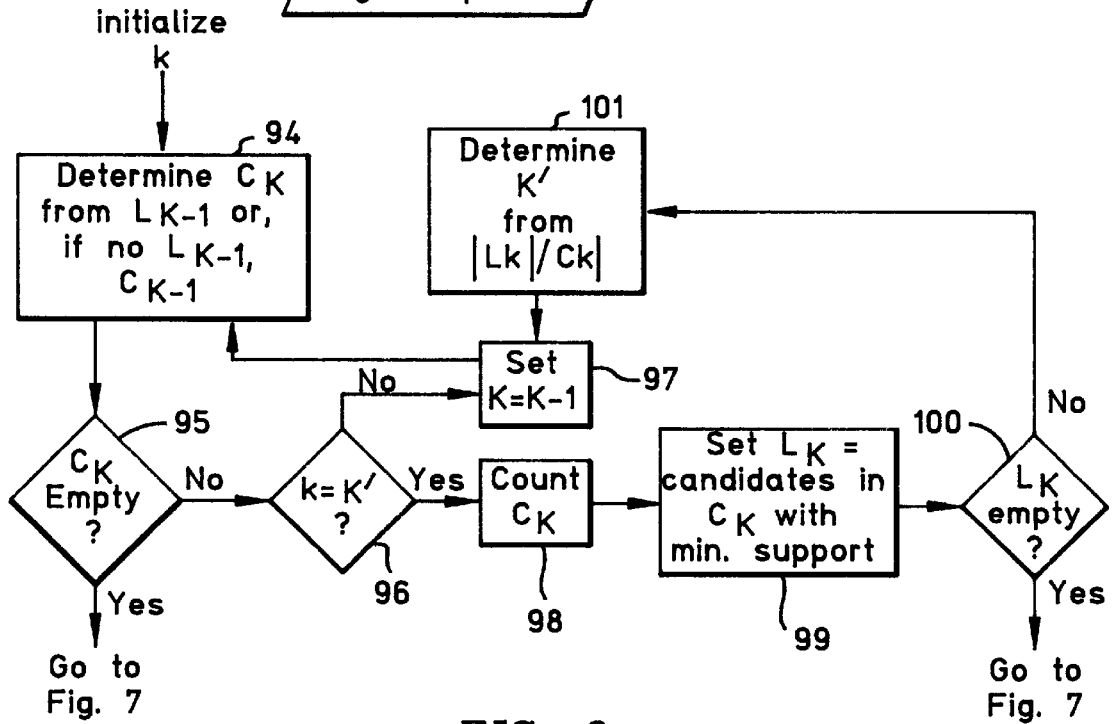
FIG. 6 is a flow chart showing the forward phase of the AprioriSome embodiment of the present invention.
Figure 7:
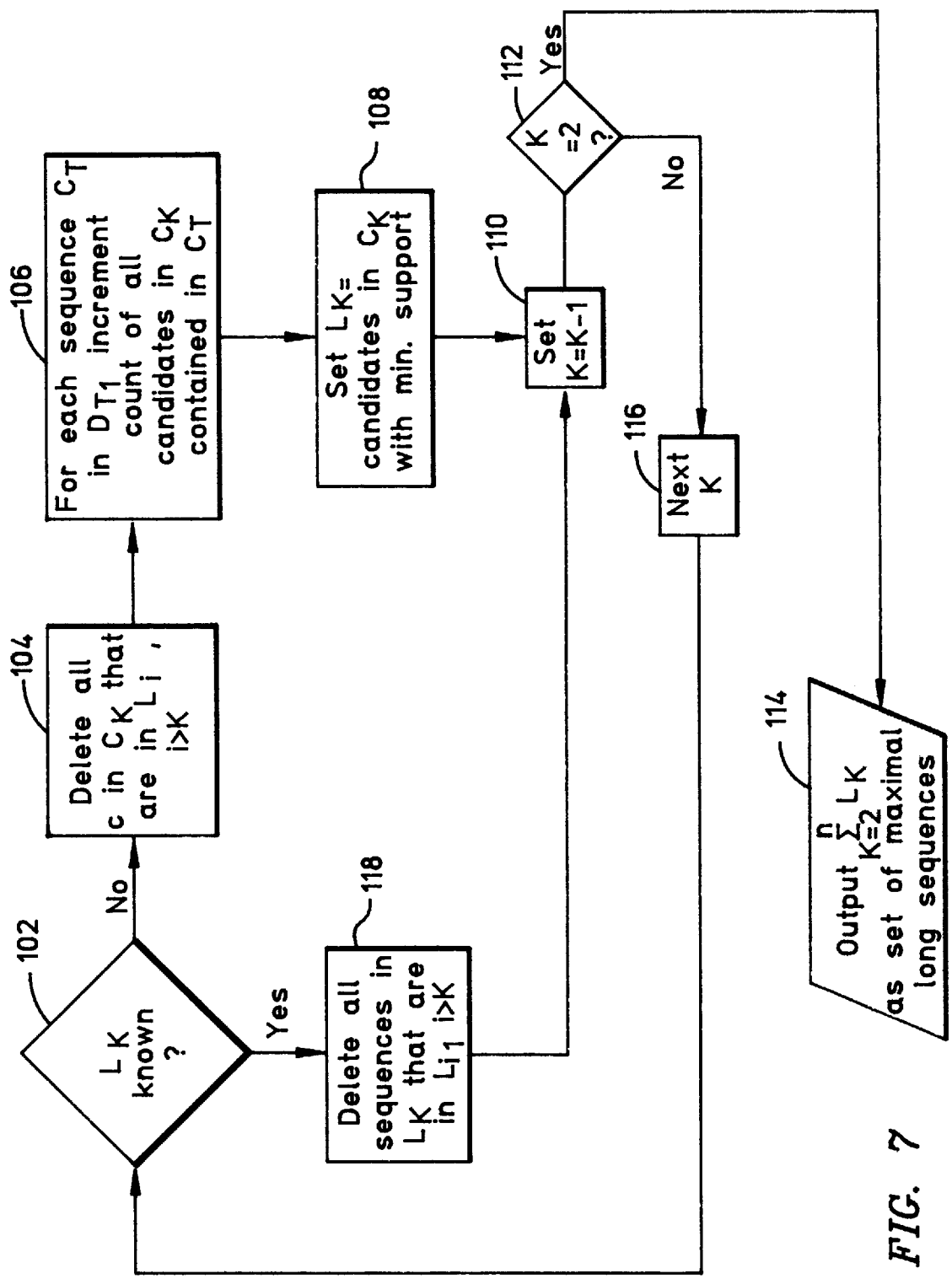
FIG. 7 is a flow chart showing the backward phase of the AprioriSome embodiment of the present invention.
Figure 8:
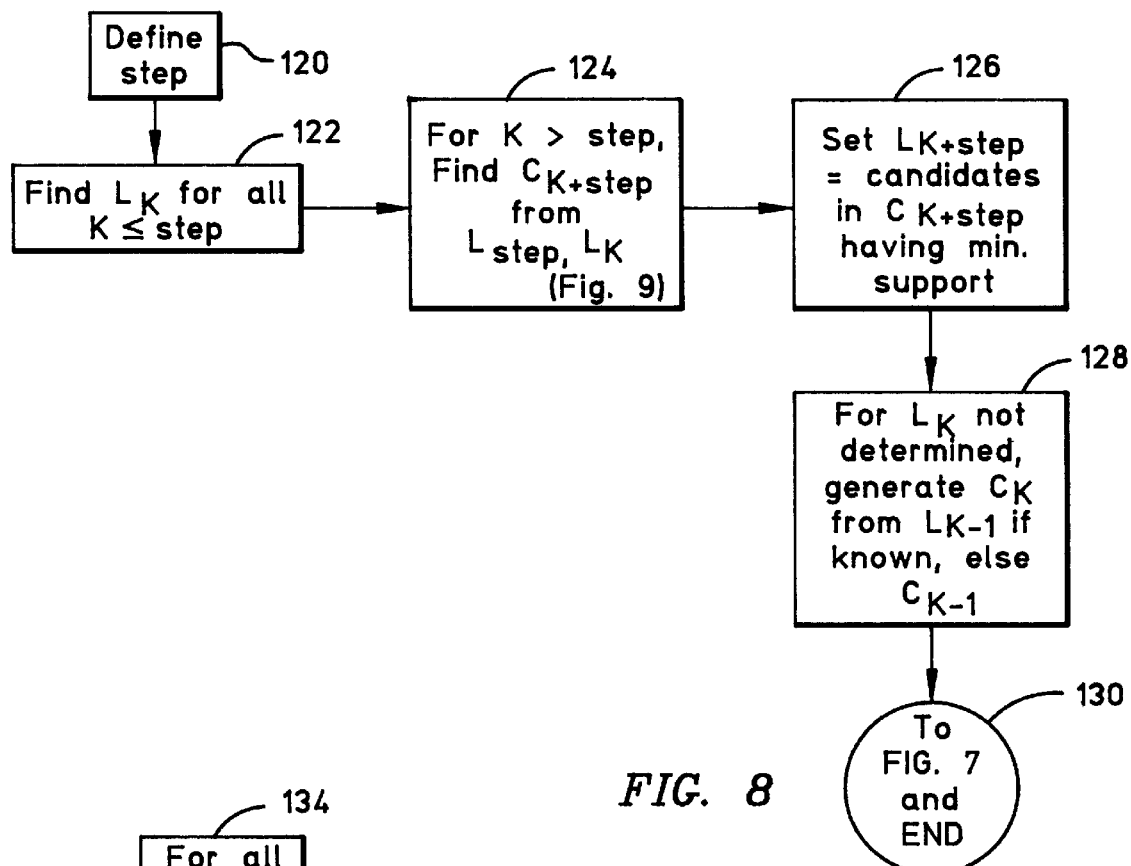
FIG. 8 is a flow chart showing the operation of the DynamicSome embodiment of the present invention.
Figure 9:
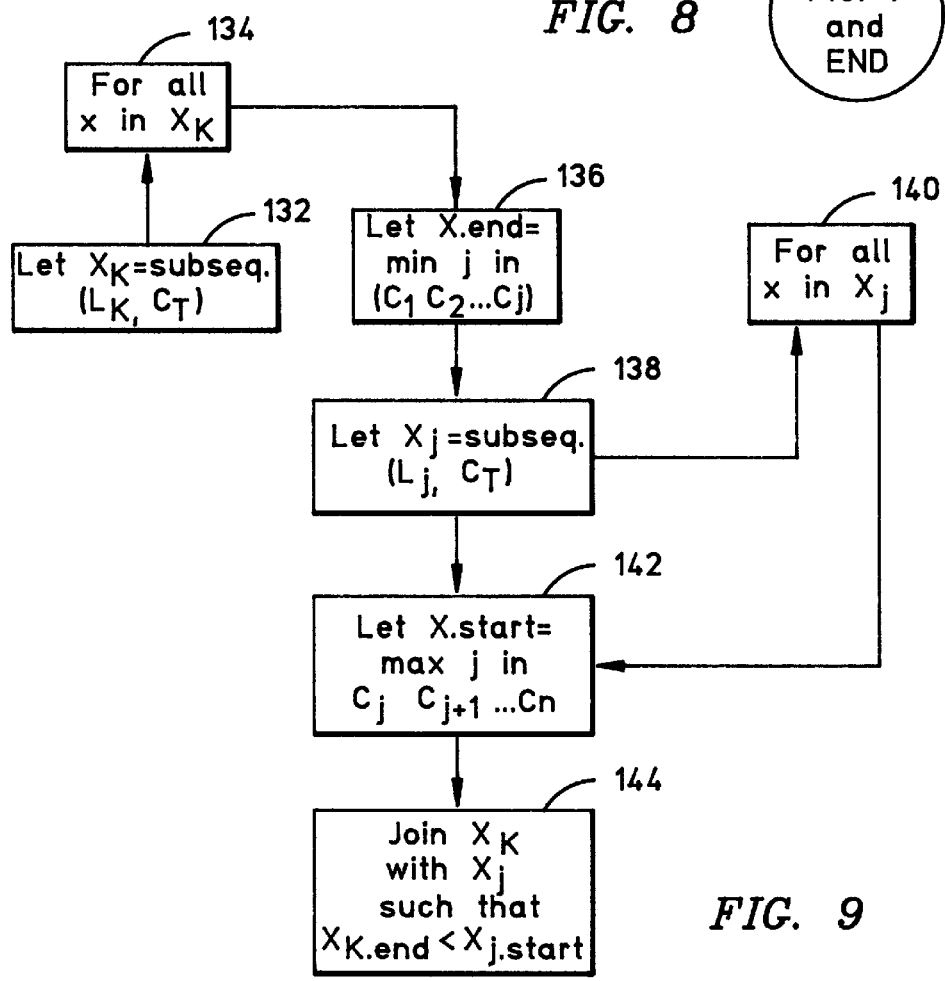
FIG. 9 is a flow chart showing the on-the-fly candidate generation steps of the DynamicSome embodiment of the present invention.

FIGS. 6–9 show alternate methods of the present invention, termed herein AprioriSome (FIGS. 6 and 7) and DynamicSome (FIGS. 8 and 9). In both of these so-called count-some methods, some sequences are counted in a forward phase, wherein successively longer candidate sequences are generated and counted, with some of the remaining sequences counted in a backward phase, wherein successively shorter sequences are counted, but generally after being sorted for maximization. Thereby, under some circumstances the count-some methods will count fewer large, non-maximal sequences than will the AprioriAll method.

Referring to FIGS. 6 and 7, the AprioriSome method begins at block 94. Like the AprioriAll method disclosed above, the AprioriSome method generates successive sets of successively longer candidate sequences $C_k$ in a forward phase, so called because in this phase each successive iteration uses a value for k which has been increased vis-a-vis the immediately preceding value for k. In contrast to the AprioriAll method, however, the AprioriSome method does not count each set $C_k$ of candidate sequences to generate a forward set $L_k$ of actual large sequences from the candidates while incrementing k upwardly. Rather, under AprioriSome the counting of some sets $C_k$ is skipped in the forward phase (FIG. 6), establishing skipped sets of candidate large sequences.

Then, after the forward phase, the skipped sets of candidate large sequences are first pruned of non-maximal sequences in a backward phase (FIG. 7), so called because in each iteration of the phase the value for k is decreased vis-a-vis the immediately preceding k. After pruning, the candidate large sequences are then counted by examining the database $D_T$ of transformed customer sequences, to determine which are large. Accordingly, the skilled artisan will recognize that under AprioriSome, the counting of some non-maximal large sequences is avoided.

At block 94 of FIG. 6, a set $C_k$ of candidate large sequences is generated as described above, using a concatenation of $L_{k-1}$, or, if $L_{k-1}$ has not been determined, the previously determined $C_{k-1}$ (wherein k=2 for the initial iteration). Moving to decision block 95, the system 10 determines whether the present set $C_k$ of candidate large sequences is empty. If so, the system 10 moves to FIG. 7. Otherwise, the method proceeds to decision block 96.

At decision block 96, the system 10 determines whether the current k equals the step value k'. If not, the method proceeds to block 97, wherein k is incremented by one (1). If, at decision block 96, the system 10 determines that k=k', the process proceeds to block 98 to count $C_k$ to determine which candidate large sequences actually are large by examining the database $D_T$ of transformed customer sequences, in accordance with the principles discussed above.

From block 98, the method moves to block 99. At block 99, a set $L_k$ of actual large sequences is defined to be the candidates in the set $C_k$ of candidate large sequences having minimum support, as determined at block 98.

Proceeding to decision block 100, the system 10 next determines whether the set $L_k$ of candidate large sequences is empty. If it is, the method proceeds to the steps of FIG. 7. Otherwise, the method proceeds to block 101.

At block 101, a step value k' for the next set of candidate large sequences to be counted is determined. Under the AprioriSome method, the step value k' does not necessarily equal the previous k plus one (1), but may equal the previous k plus some integer greater than one (1).

In determining the value of k', the following heuristic is used:

For the current iteration, find the ratio α of the absolute value of $L_k$ to $C_k$, i.e., determine $|L_k|/|C_k|$.

$$\text{If } \alpha < .666, k' = k + 1;$$

$$\text{if } .666 < \alpha < .75, k' = k + 2;$$

$$\text{if } .75 < \alpha < .80, k' = k + 3;$$

$$\text{if } .80 < \alpha < .85, k' = k + 4;$$

$$\text{if } .85 < \alpha, k' = k + 5.$$

From block 101, the method returns to block 97.

To simplify disclosure, but without loss of generality, the forward and backward phases of FIGS. 6 and 7, respectively, are discussed separately herein. It is to be understood, however, that it may be preferable to intersperse them to reduce the memory size requirements of system 10.

Thus, instead of proceeding to the backward phase of FIG. 7 only after $C_k$ or $L_k$ has been found to be empty in the forward phase, the system 10 may alternately conduct forward phase steps and backward phase steps. In other words, the system 10 may proceed to FIG. 7 after each set $L_k$ of actual large sequences is determined in the forward phase, then return to FIG. 6 to calculate the next series of skipped sets of candidate large sequences between successive counted sets, as well as the next counted set of candidate large sequences, and so on.

Now referring to FIG. 7, the backward phase of the AprioriSome method is shown. Starting with the set $L_k$ of counted large sequences having the highest k value and then iterating downwardly, the system 10 begins at decision block 102. At decision block 102, the system 10 determines whether, for the present value of k, the set $L_k$ of actual large sequences was generated (by counting the associated set $C_k$ of candidate large sequences) during the forward phase.

If not, the system 10 proceeds to block 104 to delete all sequences c in the set $C_k$ of candidate large sequences that are contained in a sequence of a set $L_i$ of actual large sequences which is larger than the set $C_k$ of candidate large sequences, wherein i>k. Next, at block 106, the system 10 counts the sequences c in the set $C_k$ of candidate large sequences by examining the transformed customer sequence database $D_T$ to determine which candidate sequences are actually large, in accordance with the principles disclosed above. Then, in accordance with the principles disclosed above, at block 108 the system 10 defines a set $L_k$ of actual large sequences to be equal to the set of candidate sequences in the set $C_k$ of candidate large sequences which have minimum support.

From block 108, the system 10 proceeds to block 110, wherein k is incremented downwardly by one (1). Then, at decision block 112, the system 10 determines whether k=2, and if so, outputs the summation of the sets $L_k$ at output block 114 as the set of maximal large sequences in the database 20. On the other hand, if, at decision block 112, the system 10 determines that k does not equal 2, then the system 10 proceeds to block 116 to test the next k by looping back to decision block 102.

If, at decision block 102, the system 10 determines that $L_k$ was known, then the system 10 proceeds to block 118 to maximize the large sequences in $L_k$ by deleting from $L_k$ all sequences that are contained in a larger set $L_i$ of actual large sequences, wherein i>k. From block 118, the system 10 proceeds to block 110 and operates as discussed previously.

FIGS. 8 and 9 show the DynamicSome concatenation regime of the present invention. Unlike the AprioriSome method, the DynamicSome not only skips counting certain sets $C_k$ of candidate large sequences in a forward phase, but does not even generate them until an intermediate phase. Then, DynamicSome uses a backward phase identical to that disclosed above for AprioriSome. Also, the generation procedure used in the forward phase of DynamicSome is unique to DynamicSome. As mentioned above, while the phases are treated separately for disclosure purposes, they may be interspersed in actual implementation.

At block 120 in FIG. 8, an initialization phase is commenced in which the system 10 receives an input representing a step integer. Sets $L_k$, $k \leq$ step integer, of actual large integers are determined as disclosed above, starting with the set of large itemsets $L_1$ as a seed set. Thus, for a user-defined step integer of 3, $L_1$, $L_2$, and $L_3$ are generated.

Next, a forward phase is commenced at block 124, wherein each $C_{k+step}$ is determined from $L_{step}$, $L_k$ as described in greater detail in reference to FIG. 9 below. At block 126, the transformed customer sequence database $D_T$ is examined to generate $L_{k+step}$ from $C_{k+step}$ in accordance with principles disclosed previously.

Then, an intermediate phase is commenced at block 128, wherein skipped sets $C_k$ of candidate large sequences are generated. If $L_{k-1}$ is known, the skipped set $C_k$ of candidate large sequences is generated by concatenating $L_{k-1}$ in accordance with the principles enunciated above. Otherwise, the skipped set $C_k$ of candidate large sequences is generated by concatenating $C_{k-1}$ in accordance with the principles enunciated above. After generating the skipped set or sets $C_k$ of candidate large sequences (depending on whether the phases of DynamicSome are interspersed with each other), at circle 130 the system 10 moves to the backward phase shown in FIG. 7 to generate and output the set of maximal large sequences.

FIG. 9 shows the details of the forward phase of the DynamicSome method. Starting at block 132, a set $X_k$ is defined to be the set of subsequences in $L_k$, wherein c=sequences in the transformed customer sequence database $D_T$. Then, at block 134 the system 10 performs, for all elements x in $X_k$, the operation shown in block 136.

At block 136, a variable $X_{end}$ is defined to be the minimum value of j in the sequence $(c_1, c_2, \ldots c_j)$, where j=the step integer defined at block 120 of FIG. 8. Next, at block 138, a set $X_j$ is defined to be the set of subsequences in $L_j$, c, wherein c=sequences in the transformed customer sequence database $D_T$. Then, at block 140, the system 10 performs, for all elements x in $X_j$, the operation scheme shown in block 142.

At block 142, a variable $x_{start}$ is defined to be the maximum value of j in the sequence $(c_j, c_{j+1}, \ldots c_n)$. At block 144, $X_k$ is concatenated with $X_j$ such that $X_{k.end} < X_{j.start}$, to thereby generate $C_{k+step}$.

While the particular system and method for mining sequential patterns as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A computer program product, including:
   a program storage device readable by a digital processing apparatus; and
   a program of instructions tangibly embodied on the program storage device and executable by the digital processing apparatus to perform method steps for identifying sequential patterns in transaction sequences which are stored in a database, each sequence comprising a plurality of temporally-spaced transactions characterized by one or more itemsets, the method steps comprising:
   (a) entering an itemset into a set of large itemsets when the number of times the itemset is present in the database exceeds a minimum support value;
   (b) generating a transformed set of transaction sequences by discarding a transaction when the transaction does not include an itemset in the set of large itemsets and discarding a transaction sequence ("sequence") when the sequence does not include an itemset in the set of large itemsets;
   (c) defining a forward set of large sequences and concatenating sequences in the forward set of large sequences to generate a next set of candidate large sequences;
   (d) comparing each sequence in the next set of candidate large sequences to the sequences in the transformed set of sequences to determine the number of times the candidate large sequence is present in the transformed set of sequences;
   (e) entering a candidate large sequence into a next forward set of large sequences when the number of times the candidate large sequence is present in the transformed set of sequences is greater than the minimum support value; and
   (f) outputting the set of maximal large sequences for identifying particular transaction sequences over time.

2. The computer program product of claim 1, further comprising:
   entering a large sequence into a set of maximal large sequences when the sequence is not contained in another large sequence;
   wherein the method iteratively repeats selected steps, and step (c) includes defining the forward set of large sequences in an iteration to be the next forward set of large sequences of the immediately preceding iteration.

3. The computer program product of claim 2, wherein the method iteratively repeats selected steps such that for each iteration the predetermined concatenation regime causes the device to concatenate the sequences in the immediately preceding forward set of large sequences to generate the next set of candidate large sequences, each candidate large sequence having one more itemsets than the large sequences used to generate it, and to successively enter candidate large sequences into the subsequent next forward set of large sequences.

4. The computer program product of claim 3, wherein the spacing between iterations is one.

5. The computer program product of claim 3, wherein selected next sets of candidate large sequences are generated by concatenating the candidate large sequences of a preceding step to generate sets of skipped candidate large sequences.

6. The computer program product of claim 5, wherein the method further comprises the steps of:
   after at least one iteration is complete, comparing skipped candidate large sequences to selected sequences generated in previous iterations;
   discarding skipped candidate large sequences when they are contained in sequences generated in previous iterations to generate a set of remaining skipped sequences;
   comparing each remaining skipped sequence to the sequences in the transformed set of sequences to determine the number of times the remaining skipped sequence is present in the transformed set of sequences; and
   entering a remaining skipped sequence into the set of maximal large sequences when the number of times the remaining skipped sequence is present in the transformed set of sequences is greater than the minimum support value.

7. The computer program product of claim 2, wherein the method iteratively repeats selected steps such that for each iteration the predetermined concatenation regime causes the device to concatenate at least some of the large sequences to generate a set of candidate large sequences, each candidate large sequence containing n itemsets more than at least some of the large sequences used to generate it, wherein n is an integer greater than one (1).

8. The computer program product of claim 7, wherein the spacing between iterations is n, and sets of candidate large sequences are generated between iterations only after at least one iteration has been completed by concatenating selected sequences to generate sets of skipped candidate large sequences.

9. The computer program product of claim 8, wherein the method further comprises the steps of:
   after at least one iteration is complete, generating skipped candidate large sequences and comparing them to sequences generated in previous iterations;
   discarding skipped candidate large sequences when they are contained in sequences generated in previous iterations to generate a set of remaining skipped sequences;
   comparing each remaining skipped sequence to the sequences in the transformed set of sequences to determine the number of times the remaining skipped sequence is present in the transformed set of sequences; and entering a remaining skipped sequence into the set of maximal large sequences when the number of times the remaining skipped sequence is present in the transformed set of sequences is greater than the minimum support value.

10. A computer-implemented method for identifying patterns in transaction sequences, each sequence comprising a series of temporally-spaced transactions which are stored in a database, each transaction including one or more itemsets, the method comprising:

(a) entering an itemset into a set of large itemsets when the number of times the itemset is present in the database exceeds a predefined minimum support value;

(b) discarding a transaction when the transaction does not include an itemset in the set of large itemsets and discarding a sequence when the sequence does not include an itemset in the set of large itemsets, to generate a transformed set of sequences;

(c) defining a forward set of large sequences and concatenating sequences in the forward set of large sequences in accordance with a predetermined concatenation regime to generate a next set of candidate large sequences;

(d) comparing each sequence in the next set of candidate large sequences to the sequences in the transformed set of sequences to determine the number of times the candidate large sequence is present in the transformed set of sequences;

(e) entering a candidate large sequence into a next forward set of large sequences when the number of times the candidate large sequence is present in the transformed set of sequences is greater than the minimum support value; and (f) outputting the set of maximal large sequences for identifying particular transaction sequences over time.

11. The method of claim 10, further comprising the step of:

entering a large sequence into a set of maximal large sequences when the sequence is not contained in another large sequence; and defining the forward set of large sequences in an iteration to be the next forward set of large sequences of the immediately preceding iteration.

12. The method of claim 11, further comprising the step of concatenating the sequences in the immediately preceding forward set of large sequences to generate the next set of candidate large sequences, each candidate large sequence having one more itemsets than the large sequences used to generate it, and to successively enter candidate large sequences into the subsequent next forward set of large sequences.

13. The method of claim 12, wherein the spacing between iterations is one.

14. The method of claim 12, wherein selected next sets of candidate large sequences are generated by concatenating the candidate large sequences of a preceding step to generate sets of skipped candidate large sequences.

15. The method of claim 14, wherein the method further comprises the steps of:

after at least one iteration is complete, comparing skipped candidate large sequences to selected sequences generated in previous iterations;

discarding skipped candidate large sequences when they are contained in sequences generated in previous iterations to generate a set of remaining skipped sequences;

comparing each remaining skipped sequence to the sequences in the transformed set of sequences to determine the number of times the remaining skipped sequence is present in the transformed set of sequences; and entering a remaining skipped sequence into the set of maximal large sequences when the number of times the remaining skipped sequence is present in the transformed set of sequences is greater than the minimum support value.

16. The method of claim 11, wherein selected steps are iteratively repeated such that for each iteration the predetermined concatenation regime concatenates at least some of the large sequences to generate a set of candidate large sequences, each candidate large sequence containing n itemsets more than at least some of the large sequences used to generate it, wherein n is an integer greater than one (1).

17. The method of claim 16, wherein the spacing between iterations is n, and sets of candidate large sequences are generated between iterations only after at least one iteration has been completed by concatenating selected sequences to generate sets of skipped candidate large sequences.

18. The method of claim 17, further comprising the steps of:

after at least one iteration is complete, generating skipped candidate large sequences and comparing them to sequences generated in previous iterations;

discarding skipped candidate large sequences when they are contained in sequences generated in previous iterations to generate a set of remaining skipped sequences;

comparing each remaining skipped sequence to the sequences in the transformed set of sequences to determine the number of times the remaining skipped sequence is present in the transformed set of sequences; and entering a remaining skipped sequence into the set of maximal large sequences when the number of times the remaining skipped sequence is present in the transformed set of sequences is greater than the minimum support value.

19. A computer program product, including:

a program storage device readable by a digital processing apparatus; and a program of instructions tangibly embodied on the program storage device and executable by the digital processing apparatus to perform method steps for identifying patterns in transaction sequences, the method steps comprising:

storing the sequences in a database, each sequence comprising a plurality of temporally-spaced transactions characterized by one or more itemsets;

identifying large sequences in the database; and outputting the large sequences for identifying particular transaction sequences over time.

20. The computer program product of claim 19, wherein the identifying step comprises the steps of:

(a) entering an itemset into a set of large itemsets when the number of times the itemset is present in the database exceeds a predefined minimum support value;

(b) discarding a transaction when the transaction does not include an itemset in the set of large itemsets and discarding a sequence when the sequence does not include an itemset in the set of large itemsets, to generate a transformed set of sequences;

(c) defining a forward set of large sequences and concatenating sequences in the forward set of large sequences in accordance with a predetermined concatenation regime to generate a next set of candidate large sequences;

(d) comparing each sequence in the next set of candidate large sequences to the sequences in the transformed set of sequences to determine the number of times the candidate large sequence is present in the transformed set of sequences; and (e) entering a candidate large sequence into a next forward set of large sequences when the number of times the candidate large sequence is present in the transformed set of sequences is greater than the minimum support value.

21. The computer program product of claim 20, wherein the method further comprises:

entering a large sequence into a set of maximal large sequences when the sequence is not contained in another large sequence, wherein the method iteratively repeats selected steps, and step (c) includes defining the forward set of large sequences in an iteration to be the next forward set of large sequences of the immediately preceding iteration.

22. The computer program product of claim 21, wherein the method iteratively repeats selected steps such that for each iteration the predetermined concatenation regime causes the device to concatenate the sequences in the immediately preceding forward set of large sequences to generate the next set of candidate large sequences, each candidate large sequence having one more itemsets than the large sequences used to generate it, and to successively enter candidate large sequences into the subsequent next forward set of large sequences.

23. The computer program product of claim 22, wherein the spacing between iterations is one.

24. The computer program product of claim 23, wherein selected next sets of candidate large sequences are generated by concatenating the candidate large sequences of a preceding step to generate sets of skipped candidate large sequences.

25. The computer program product of claim 24, wherein the method further comprises the steps of:

after at least one iteration is complete, comparing skipped candidate large sequences to selected sequences generated in previous iterations;

discarding skipped candidate large sequences when they are contained in sequences generated in previous iterations to generate a set of remaining skipped sequences;

comparing each remaining skipped sequence to the sequences in the transformed set of sequences to determine the number of times the remaining skipped sequence is present in the transformed set of sequences; and entering a remaining skipped sequence into the set of maximal large sequences when the number of times the remaining skipped sequence is present in the transformed set of sequences is greater than the minimum support value.

26. A computer-implemented method for identifying transaction sequences comprising:

storing the sequences in a database, each sequence including a plurality of temporally-spaced transactions characterized by one or more itemsets;

identifying large sequences in the database; and outputting the maximal large sequences for identifying particular transaction sequences.

27. The method of claim 26, wherein the identifying step comprises the steps of:

(a) entering an itemset into a set of large itemsets when the number of times the itemset is present in the database exceeds a predefined minimum support value;

(b) discarding a transaction when the transaction does not include an itemset in the set of large itemsets and discarding a sequence when the sequence does not include an itemset in the set of large itemsets, to generate a transformed set of sequences;

(c) defining a forward set of large sequences and concatenating sequences in the forward set of large sequences in accordance with a predetermined concatenation regime to generate a next set of candidate large sequences;

(d) comparing each sequence in the next set of candidate large sequences to the sequences in the transformed set of sequences to determine the number of times the candidate large sequence is present in the transformed set of sequences;

(e) entering a candidate large sequence into a next forward set of large sequences when the number of times the candidate large sequence is present in the transformed set of sequences is greater than the minimum support value; and (f) entering a large sequence into a set of maximal large sequences when the sequence is not contained in another large sequence.

28. A database mining system for mining patterns in transaction sequences which are stored in a database, each sequence including a plurality of temporally unique transactions characterized by one or more itemsets, comprising:

means for entering an itemset into a set of large itemsets when the number of times the itemset is present in the database exceeds a predefined minimum support value;

means accessing the entering means for discarding a transaction when the transaction does not include an itemset in the set of large itemsets and discarding a sequence when the sequence does not include an itemset in the set of large itemsets, to generate a transformed set of sequences;

means for defining a forward set of large sequences and concatenating sequences in the forward set of large sequences in accordance with a predetermined concatenation regime to generate a next set of candidate large sequences;

means accessing the discarding means and defining means for comparing each sequence in the next set of candidate large sequences to the sequences in the transformed set of sequences to determine the number of times the candidate large sequence is present in the transformed set of sequences;

means accessing the comparing means for entering a candidate large sequence into a next forward set of large sequences when the number of times the candidate large sequence is present in the transformed set of sequences is greater than the minimum support value; and means for outputting the large sequences for identifying patterns in transaction sequences.

29. The system of claim 28, further comprising:

means for entering a large sequence into a set of maximal large sequences when the sequence is not contained in another large sequence;

wherein selected means iteratively repeat their respective functions such that for each iteration the predetermined concatenation regime causes the system to concatenate the sequences in the immediately preceding next forward set of large sequences to generate the next set of candidate large sequences, each candidate large sequence having one more itemset than the large sequences used to generate it, and to successively enter candidate large sequences into the subsequent next forward set of large sequences.

30. A database mining system for mining transaction sequences, comprising:
   a database storing the sequences, each stored sequence including a plurality of transactions having itemsets and associated time fields;
   a support value input mechanism for defining a minimum support value; and
   a large sequence determiner in operable communication with the database and the support value input mechanism for comparing the number of times a sequence is repeated in the database and for designating the sequence as a large sequence when the number of times is greater than the minimum support value, to thereby mine the database for particular transaction sequences.

31. The database mining system of claim 30, further comprising a maximal large sequence generator accessing the large sequence determiner for designating as a maximal large sequence any large sequence which is not contained in another large sequence to thereby mine the database for maximal large sequences.

32. A computer program product, comprising:
   a computer usable data storage device;
   computer readable program means embodied on the data storage device for identifying sequential patterns in transaction sequences stored in a database, each sequence comprising a plurality of temporarily-spaced transactions characterized by one or more item sets, the computer readable code means including:
      first computer readable program code means for causing a computer to enter an item set into a set of large item sets when the number of times the item set is present in a database exceeds a minimum support value;
      second computer readable program code means for causing a computer to generate a transformed set of transaction sequences by discarding a transaction when the transaction does not include an item set in the set of large item sets and discarding a transaction sequence ("sequence") when the sequence does not include an item set in the set of large item sets;
      third computer readable program code means for causing a computer to define a forward set of large sequences and concatenate sequences in the forward set of large sequences to generate a next set of candidate large sequences;
      fourth computer readable program code means for causing a computer to compare each sequence in the next set of candidate large sequences to the sequences in the transformed set of sequences to determine the number of times the candidate large sequence is present in the transformed set of sequences;
      fifth computer readable program code means for causing a computer to enter a candidate large sequence into a next forward set of large sequences when the number of times the candidate large sequence is present in the transform set of sequences is greater than the minimum support value; and
      sixth computer readable program code means for causing a computer to output the set of maximum large sequences to identify particular transaction sequences over time.

33. A computer program product, comprising:
   a program storage device having a computer usable medium; and
   computer readable program code means embodied in the computer usable medium for identifying patterns in transaction sequences stored in a database, the computer readable program code means including:
      a first computer readable program code means for causing a computer to store the sequences in a database, each sequence comprising a plurality of temporarily-spaced transactions characterized by one or more item sets;
      a second computer readable program code means for causing a computer to identify large sequences in a database; and
      a third computer readable program code means for causing a computer to output the large sequences to identify particular transaction sequences over time.

* * * * *